(12) United States Patent
Bruni et al.

(10) Patent No.: US 11,460,072 B2
(45) Date of Patent: Oct. 4, 2022

(54) LINEAR MOTION GUIDE

(71) Applicant: SCHNEEBERGER HOLDING AG, Roggwil (CH)

(72) Inventors: Jaques Bruni, Ettingen (CH); Thomas Grolimund, Langenthal (CH)

(73) Assignee: SCHNEEBERGER HOLDING AG, Roggwil (CH)

(*) Notice: Subject to any disclaimer, the term of this patent is extended or adjusted under 35 U.S.C. 154(b) by 0 days.

(21) Appl. No.: 17/255,935

(22) PCT Filed: Jun. 26, 2019

(86) PCT No.: PCT/EP2019/000196
§ 371 (c)(1),
(2) Date: Jan. 20, 2021

(87) PCT Pub. No.: WO2020/001808
PCT Pub. Date: Jan. 2, 2020

(65) Prior Publication Data
US 2021/0262521 A1 Aug. 26, 2021

(30) Foreign Application Priority Data
Jun. 27, 2018 (DE) .................... 20 2018 003 002.3

(51) Int. Cl.
*F16C 29/06* (2006.01)
(52) U.S. Cl.
CPC ...... *F16C 29/0657* (2013.01); *F16C 29/0602* (2013.01)

(58) Field of Classification Search
CPC .............. F16C 29/0602; F16C 29/0604; F16C 29/0607; F16C 29/0611; F16C 29/0652;
(Continued)

(56) References Cited

U.S. PATENT DOCUMENTS 5,947,605 A 9/1999 Shirai
6,200,031 B1 * 3/2001 Faulhaber ................ B23Q 1/40
384/45

(Continued)

FOREIGN PATENT DOCUMENTS

DE 102004043027 A1 4/2005
DE 60314583 T2 3/2008
(Continued)

*Primary Examiner* — Phillip A Johnson
(74) *Attorney, Agent, or Firm* — Tarolli, Sundheim, Covell & Tummino LLP (57) ABSTRACT

The invention relates to a carriage of a linear motion guide for arranging on a rail of the linear motion guide, said carriage having an at least substantially U-shaped cross-section and having at least one substantially U-shaped base body (15) which is supplemented with plastic components, wherein the carriage, in both legs of the U-shape, is in each case connected to at least one self-contained rolling body housing (7) which is kept open towards the rail in order to guide as precisely as possible on the rail and nevertheless being easy to assemble. According to the invention, at least parts of inner and outer boundary surfaces of a return channel (10) and both deflection channels (11) of one of the rolling body housings in the respective leg are formed by means of a one-piece plastic component in both legs of the carriage.

9 Claims, 6 Drawing Sheets (58) Field of Classification Search
CPC .............. F16C 29/0654; F16C 29/0657; F16C 29/0659; F16C 29/0661; F16C 29/0664
See application file for complete search history.

(56) References Cited

U.S. PATENT DOCUMENTS

| | | | |
|---|---|---|---|
| 6,520,681 B2 * | 2/2003 | Ishihara | F16C 29/0657 384/45 |
| 7,121,724 B2 * | 10/2006 | Lee | F16C 29/0607 384/45 |
| 9,297,415 B2 * | 3/2016 | Chu | F16C 29/0611 |
| 2011/0033141 A1 * | 2/2011 | Chen | F16C 29/0611 384/45 |

FOREIGN PATENT DOCUMENTS

| | | |
|---|---|---|
| DE | 202012101098 U1 | 5/2012 |
| DE | 202016100552 U1 | 3/2016 |

* cited by examiner

LINEAR MOTION GUIDE

RELATED APPLICATIONS

The present invention is a U.S. National Stage under 35 USC 371 patent application, claiming priority to Serial No. PCT/EP2019/000196, filed on 26 Jun. 2019; which claims priority of DE 20 2018 003 002.3, filed on 27 Jun. 2018, the entirety of both of which are incorporated herein by reference.

The invention relates to a carriage of a linear motion guide for arrangement on a rail of the linear motion guide, which has an essentially U-shaped cross-section, and is provided with an essentially U-shaped base body, the base body being supplemented with plastic components, wherein the carriage, in both legs of the U-shape, is respectively provided with a self-contained rolling body housing for the circulation of rolling bodies, which is respectively kept open towards the rail.

Linear motion guides of this type are employed for linearly guiding machine components, which is necessary for example in moving the translating axes of a machine tool. Here the guide rail is fastened to a base, usually by screw connections. The carriage, which can also be called a guide carriage, is provided with at least one rolling body housing in both legs of its very approximately U-shape. Rolling bodies circulate in the latter. In a load section of the rolling body housing running in a straight line and parallel to the longitudinal axis of the guide rail, the rolling bodies momentarily located there are supported both on the carriage and also on a lateral surface of the guide rail. In this manner, both linear relative motion between the guide rail and the carriage and load transfer, particularly of a load operating on the carriage to the rail, can occur.

Although the linear motion guide is often employed in a very dirty environment and under unfavorable conditions, such as for example in high or extremely fluctuating temperatures, high accuracy is required of it. To this end, a substantial requirement is that the rolling bodies are not contaminated, as this has a detrimental influence on wear and on guide accuracy. Inaccuracies in the rolling body housing also have a negative effect on wear.

In addition, requirements with respect to the easiest possible construction and the easiest possible assembly are placed on linear motion guides. Solutions for satisfying these requirements are often opposed to the requirements placed on linear motion guides for accurate guidance and smooth running.

It is the object of the invention to specify a method by which the rolling bodies of a carriage of a linear motion guide of the initially mentioned type can be guided accurately and the carriage can nevertheless be assembled with the smallest possible effort.

According to the invention, the object is achieved in a guide carriage, as well as in a carriage for a linear motion guide of the initially mentioned type, by the characterizing feature of claim 1. In this case, provision can be made that by means of one each, particularly only one, single-piece plastic component, in each of the two legs of the carriage, respectively at least parts of the inner and outer boundary surfaces of a return channel as well as of the inner and outer boundary surfaces of both deflection channels are formed from one of the rolling body housings in the respective leg.

Moreover, the object is achieved by the linear motion guide according to claim 14.

According to the invention, all inner and outer boundary surfaces of return and deflection channels of two rolling body housings in different legs of the carriage can advantageously be formed in one piece from a single common plastic component. In this manner, not only can the component and material transfers in one respective rolling body housing, which entail the danger of rough running and increased wear, be reduced. Moreover, the danger of inaccuracies with respect to the mutual alignment of the rolling body housings on both sides of the rail can be reduced.

In particular, the single-piece and thus step—as well as transfer-less and seamless configuration, according to the invention, of the transitions between the respective return channel and the outer boundary surface, loaded with centrifugal and pressure forces, of the deflection channel, affect positively both the wear and also the smooth running behavior of the carriage.

Due to the advantageous and preferred methods according to the invention a particularly easy, fast and nevertheless exact assembly of a carriage according to the invention results. The few components required for the construction of at least one rolling body housing on both sides of the guide rail can be assembled particularly quickly and accurately. Due to the single-piece configuration, the invention is also suitable in particular for particularly small linear motion guides, in which small-sized components resulting from the size of such guides are inherently particularly difficult to handle and to align with one another for assembly. This difficulty is overcome due to the combination of otherwise numerous components, structurally separate from one another, into a single one-piece component.

The features and advantages mentioned can be further improved in a particularly preferred embodiment, in which both single-piece plastic components of the rolling body housings of different legs are connected together into a single piece.

In an additional preferred embodiment of the invention, all lower, inner and outer boundary surfaces of the component parts of the rolling body housings provided in both legs of the carriage can be formed on the single-piece plastic component. In this manner, the assembly can be further simplified and the ensuring of the correct orientations of individual components of the carriage can be further improved. The load zone of each rolling body housing can, on the contrary, be advantageously formed on respectively one surface of the base body of the carriage, preferably on opposite inner surfaces of the leg of the base body. These surfaces of the load zones are outer surfaces of the leg of the carriage and of the base body and are therefore preferably located on one and not in one of the legs of the carriage.

Moreover, it has proven particularly advantageous if, during the formation of the upper—with respect to a horizontal arrangement of the linear motion guide, i.e. facing the assembly surface—boundary surfaces of at least one of the rolling body housings, at least one insert joinable in or on the plastic component is provided. Here it is preferred if the insert, preferably formed as a single piece component, covers or provides an upper limit to the rolling body housing over the entire length of the respective return channel as well as over the entire length of both deflection channels. In this embodiment, in order to close the respective rolling body housing, the respective insert or insert component must thus only be inserted from above into the single-piece plastic component with the at least inner and outer boundary surfaces of the deflection channel and of the return channel. A simple and nevertheless accurate assembly of the carriage according to the invention can also result from this method.

In a particularly preferred embodiment of the invention, the assembly effort can be further reduced in that the insertable insert is formed as a plastic component and the upper boundary surfaces of both deflection channels as well as of the return channel of at least one of the circulation channels are formed on this insert.

Finally, the assembly effort can be further reduced and the accuracy of orientation of the components of several rolling element housings of the carriage can be further improved if, in a particularly preferred embodiment of the invention, inserts of rolling body housings of different legs of the carriage and at least one, preferably two bridge parts binding both inserts together are formed as a single-piece overall insert component.

Here in particular it can advantageously be provided that for two rolling body housings arranged in different legs of the carriage, respectively one insert for the formation of the upper boundary surface is provided, wherein both inserts are connected together into a single piece with at least one bridge section. In addition, it can advantageously be provided that respectively in the zone of the upper boundary surface of the deflection channel respectively one bridge section is formed, which is located over the upper boundary surfaces and over the rolling body housings and is respectively formed in one piece with the inserts. By means of a method of this kind, the insert component can be designed light and nevertheless particularly stable. In addition, the bridge parts arranged on the face of the insert component can be used for producing a releasable connection with the single-piece plastic component and/or with the metallic base body, which is preferably inserted between the two bridge parts of the insert component.

An additional preferred solution can contribute to the reduction of assembly effort. In this, the single-piece plastic component is releasably fastened by means of at least one snap coupling to another component of the carriage, or releasably attached to it. Preferably, the single-piece plastic component is releasably fastened at both of its faces respectively to at least one snap coupling, wherein the snap couplings are preferably provided at both faces with the same component of the carriage. Preferably, the single-piece plastic component is fastened to the insert component by means of the at least two snap couplings, wherein the insert component is preferably inserted into the single-piece plastic component in such a manner that both bridge pieces of the insert element are located between the plate-shaped sections of the single-piece plastic component.

On the other hand, the insert component is preferably fastened to the metal base body, wherein this fastening is also preferably formed as at least one snap coupling. A particularly advantageous further development of this solution can be provided in that the insert component is releasably fastened in the zone of its two bridge pieces respectively with one snap coupling, to the base body of the carriage.

With regard to a direction—in a direction viewed transversely to the provided longitudinal motion direction—the snap couplings can preferably be arranged centrally in each case. Particularly favorable properties result, in that all snap couplings between the base body, the insert element and the single-piece plastic component are arranged along an axis which, in the operating position of the carriage on the guide rail, runs parallel to the rail.

Additional preferred embodiments of the invention are obtained from the claims, the description and the drawing.

The invention is explained in more detail with reference to embodiments shown purely schematically in the figures, which show:

FIG. 7 a perspective view of two respective single-piece components of the carriage of FIG. 1; in which the return and deflection channels of rolling body housings are developed, as well as a view from below of one of the two components;

Figure 1:
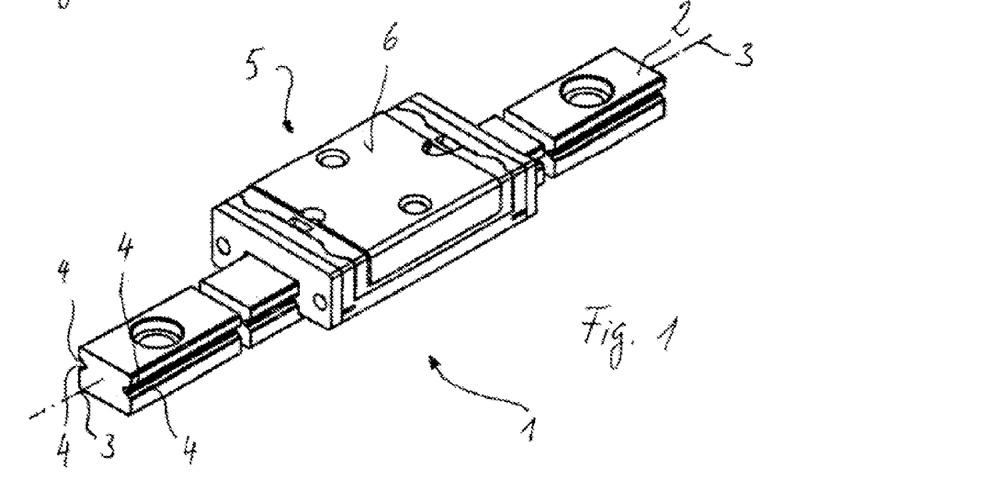
FIG. 1 a perspective view of a preferred embodiment of a linear motion guide according to the invention, with a guide rail and a longitudinally adjustable carriage arranged on the guide rail.
Figure 2:
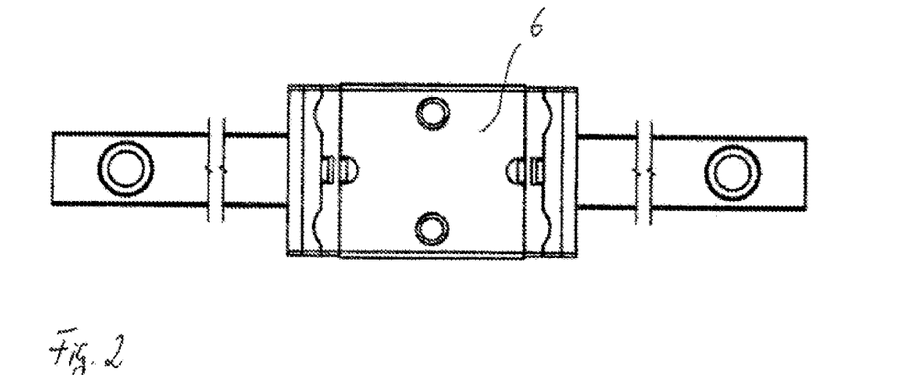
FIG. 2 a plan view of the linear motion guide of FIG. 1.
Figure 3:
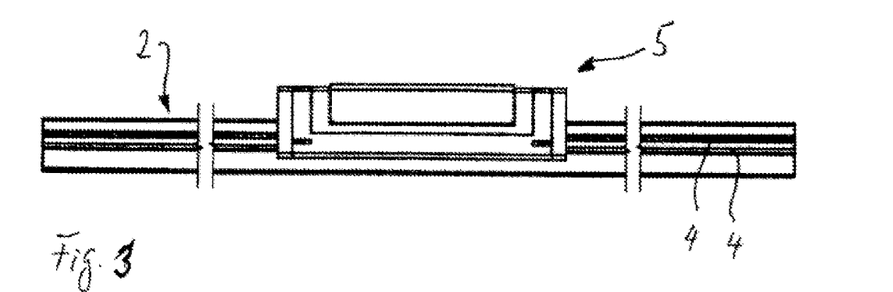
FIG. 3 a side view of the linear motion guide of FIG. 1.

A linear motion guide 1 is shown in FIG. 1, which has a guide rail 2 as well as a carriage 5 arranged on the guide rail 2 and longitudinally adjustable along the longitudinal axis 3 of the guide rail. The guide rail 2 is fastened to a suitable base by means of screw connections. As can be seen in FIG. 1, the guide rail 2 has a substantially rectangular cross-sectional shape, wherein it is provided on both of its lateral surfaces with two circulation surfaces 4 for rolling bodies. The two circulation surfaces 4 on each side are arranged at an angle of 90° to one another and contact and support of the rolling bodies of the carriage 5 is provided for. The angle definition is quoted only as an example, and other angle definitions can also be provided in connection with the present invention.

The carriage 5, which can also be called a guide carriage, has on an upper side an at least substantially flat assembly surface 6, which is provided for the accommodation, arrangement and for guided movement on the rails of a load to be moved (not shown). As can be seen particularly in FIG. 4, the carriage 5 has, as a cross-section, one with a substantially U-shape. In the illustration of FIG. 1, which illustrates the usual operating mode with an arrangement of the rail on a horizontal surface of the linear motion guide 1, the U-shape is rotated by 180°. In principle, the linear motion guide 1 is usable with any desired spatial orientation of the rail 2.

The carriage 5 of the exemplary embodiment of the invention shown here is provided with one rolling element housing 7 respectively in each of its two legs 5a resulting from the U-shape. Each of the two rolling body housings 7 is filled with balls, generally steel balls, as rolling bodies which, during relative movement of the carriage 5 with respect to the rail 2 in the longitudinal direction of the rail 2—and hence in the movement direction of the linear motion guide—circulate in their respective rolling body housing 7. The two antisymmetric but otherwise identically constructed rolling body housings 7 each have one load zone 8 or load section situated immediately opposite the running surfaces 4 of the rail 2 running in a straight line and parallel to the longitudinal axis 3 of the rail. Each rolling body housing 7 is provided with a return channel 10 for the rolling bodies, parallel and spaced away from the respective load zone 8. The dimensions of the respective load zones 8 and of the return channels 10 are identical. The return channel 10 and the load zone 8 of each rolling body housing 7 are connected together at both their ends by means of a deflection channel 11. Each of the two deflection channels 11 of a rolling body housing 7 has a curved profile and runs along a circular arc of at last approximately 180°. The return channels 10 and the deflection channels 11 have, over their entire lengths, a constant cross-section and are completely enclosed with respect to their cross-sections. In the load zone 8, load surfaces 14 are only formed on an inner side of the respective leg of the carriage 5 which is in contact with the rolling bodies, while at the same time resting against the running surfaces 4 of the rail 2.

Figure 4:
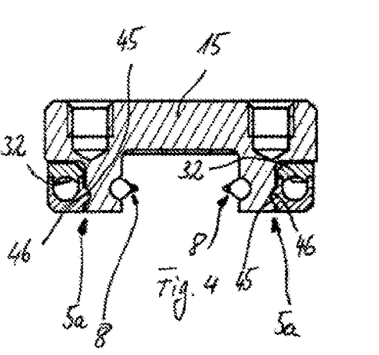
FIG. 4 a cross-sectional view of the carriage of the linear motion guide of FIG. 1, together with a side view and a plan view of the linear motion guide.
Figure 5:
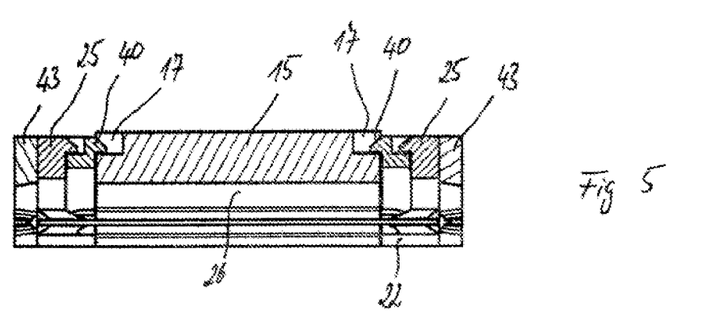
FIG. 5 a longitudinal section view of the carriage of the linear motion guide of FIG. 1.
Figure 6:
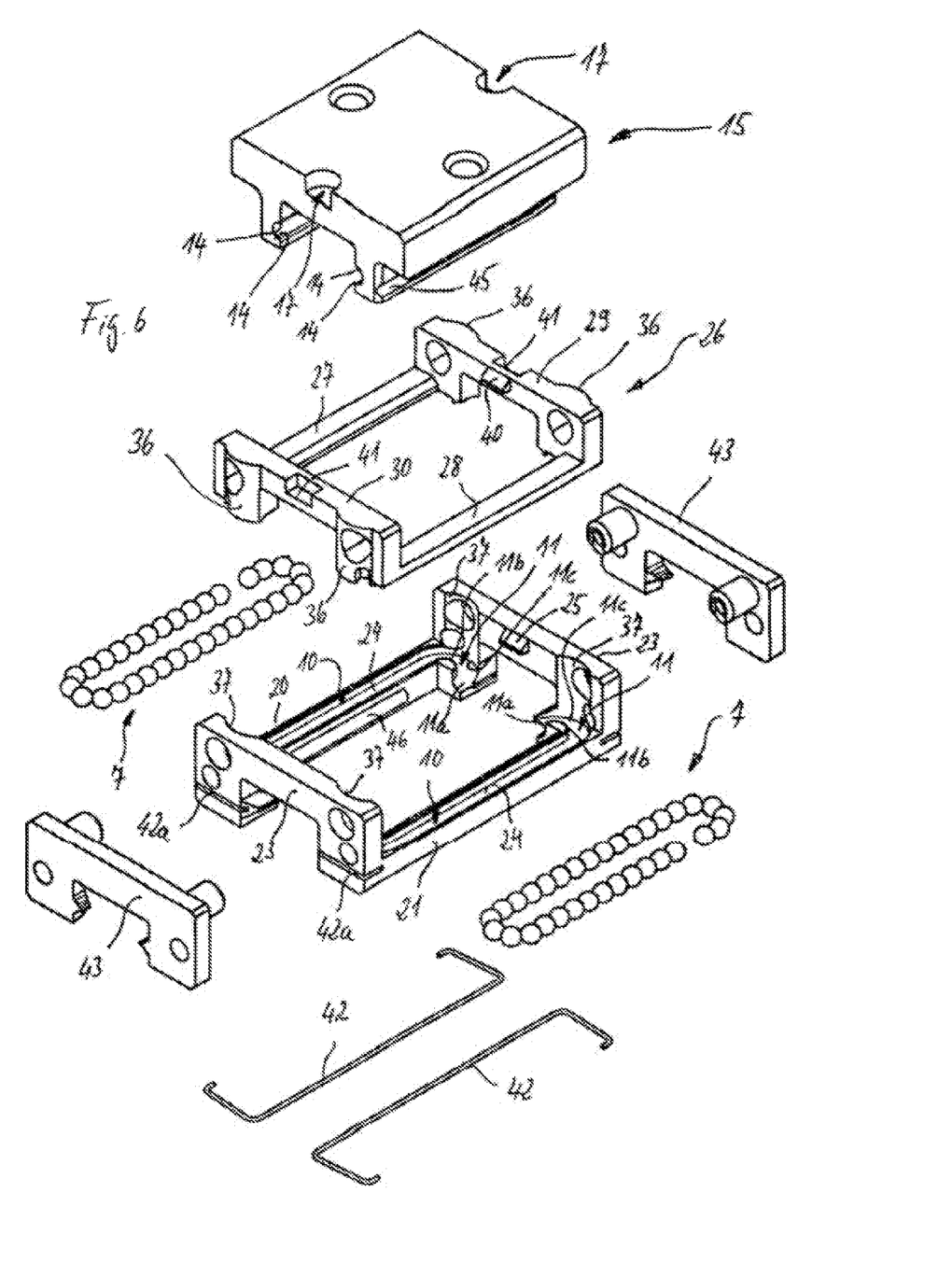
FIG. 6 an exploded view of the carriage of FIG. 1.

As emerges from FIGS. 1, 4 and 6 among others, the carriage 5 has a base body 15, particularly a metallic base body. An assembly table with a magnetic surface 6 for the arrangement of a load on the carriage 5 is formed on the metallic base body 15. The base body 15 also already has the substantially U-shape of the carriage 5. To this end, two legs of the base body 15, parallel and distant from one another, extend perpendicularly from the assembly table. According to this preferred embodiment of the invention, shown here, only the surfaces of the load zones 8 of the rolling body housings 7 are formed on the base body 15 of the two rolling element housings 7. All other channels 10, 11, and their surfaces, of the two rolling body housings are formed on only two additional components of the carriage 5, as will be explained in more detail hereafter.

In the zone of the face sides of the base body 15, it is provided with respectively one centrally arranged recess 17. Respectively one detent lug of another component can be arranged into this for the generation of a snap-lock connection, as will be further explained hereafter.

In the first of these two components preferably respectively manufactured using an injection molding method, two webs 20, 21 running parallel to one another are provided, which run with their longitudinal extensions parallel to the longitudinal axis of the rail 2. The two webs 20, 21 of this single-piece plastic component 22 are connected together on their face ends by means of, in each case, one substantially U-shaped plate-shaped section 23 of the single-piece plastic components 22. The plate-shaped sections 23 have a bridge-like shape and are connected at lower ends with the end zones of the webs 20, 21. The two plate-shaped sections 23 are oriented parallel to one another and substantially transverse to the longitudinal extension of the webs 20, 21.

As can be seen from FIGS. 6 and 7 among others, a straight, upwardly open gutter 24 is formed on the upper side of the webs. The cross-sectional shape of this respective gutter 24 corresponds substantially to a semicircle—upwardly open in the illustration of FIG. 4, which is continued on either side of the ends of the semicircle shape with respectively one straight section. The two straight sections run parallel to one another and have a spacing from one another which corresponds to the diameter of the semicircular shape. The lengths of the sections running parallel to one another of the cross-sectional shape correspond at least approximately to the radius of the semicircular shape. This upwardly open gutter 24 is a portion of the respective return channel 10 of the corresponding rolling body housing 7.

An additional gutter section curved towards the rail 2 is connected to both face ends of the upwardly open gutter sections of the return channel 10. These additional gutter sections are lower zones of the respective deflection channels 11 belonging to the same rolling body housing 7. With respect to the cross-sectional shapes, the gutter zones of the return channels 10 and the cross-sectional shapes of all deflection channels 11 are identical. The gutter zones of the deflection channels 11 thus have as boundary surfaces a lower wall zone 11a, as well as an inner 11b and an outer wall zone 11c of the respective deflection channel 11.

Thus the lower, as well as the inner and the outer wall surfaces or wall zones of the return channel 10 of the two deflection channels 11 of each of the two rolling element housings 7, entirely formed on the single-piece plastic component 22, are continuous over the entire length and provided with a constant cross-sectional shape. The entire lower, outer and inner boundary surfaces of these channels are therefore formed, particularly continuously formed, on the insert component.

It is also recognizable in FIG. 6 that a detent lug 25 of a snap-lug connection is formed on the inner side of each of the two plate-shaped sections 23 in the zone of an upper side. These detent lugs 25—provided on the inner sides of both plate-shaped sections 23 with respect to its longitudinal extension—can be deflected elastically at least slightly with respect to the plate-shaped sections 23.

Finally, in FIGS. 6 and 7, the second component for the formation of the rolling body housings is shown, which hereafter will be designated the insert component 26. The insert component 26 is, with respect to its outer shape, fundamentally similarly configured to the single-piece plastic component 22. The likewise single-piece configured insert component 26 also has two webs 27, 28 oriented with constant spacing from one another, which are oriented, in their operating position on the carriage 5, parallel to the webs 20, 21 of the single-piece plastic component 22. The webs 27, 28 are connected together into a single piece by means of component sections transverse to the webs 27, 28 and respectively positioned on their face ends, which hereafter are designated bridge parts 29, 30. The spacing of the bridge parts 29, 30 from one another is less than the spacing of the plate-shaped sections 23 from one another. The bridge parts 29, 30 also have at least approximately a U-shape, by which the insert component—like the base body and the single-piece plastic component as well—can accommodate the rail 2 between its parallel legs of the U-shape.

It can be gathered from FIG. 4 that upper boundary surfaces 32 or wall zones of the return channels 10 are formed on the respective lower side of the two webs 27, 28 of the insert component 26. Likewise, the upper boundary surfaces 33 of the respective two deflection channels 11 of the two rolling body housings 7 are formed on the lower sides of the insert component 26. The respective upper boundary surface 33 of the respective deflection channel 11 merges continuously and without transition into the respective upper boundary surface 32 of the respective return channel 10 of the same rolling body housing 7. The boundary surfaces 32, 33 of the return channel 10 and of the two deflection channels 11 for each of the two rolling body housings 7 are single-piece, continuous and provided with a constant cross-sectional shape. Thus, the complete upper boundary surface of the deflection channels 10 and of the return channels 11 are formed on the insert component 26. The return channels and the deflection channels are thus self-contained in their respective circumference.

Finally, each of the respective bridge parts 29, 30 has at its two outer sides cylindrical-sector shaped bulges 36, which are located approximately at the height of the webs 27, 28. In each of the bulges 36, a through bore is additionally provided approximately above each web 27, 28. The size, shape and position of the bulges 36 are matched to the concave shaping 37 at inner surfaces of the single-piece plastic component 22. The plate-shaped sections 23 of the single-piece plastic component 22 are respectively provided with one through bore in the zone of the concave shaping 37.

It can also be noted in FIG. 6 that, on the inner side of each of the two bridge parts 29, 30, a detent lug 40 of a snap coupling is formed in the zone of an upper edge. These detent lugs 40 provided centrally on the inner sides of the two bridge parts 29, 30 can be at least slightly elastically deflected with respect to the bridge parts.

Figure 8:
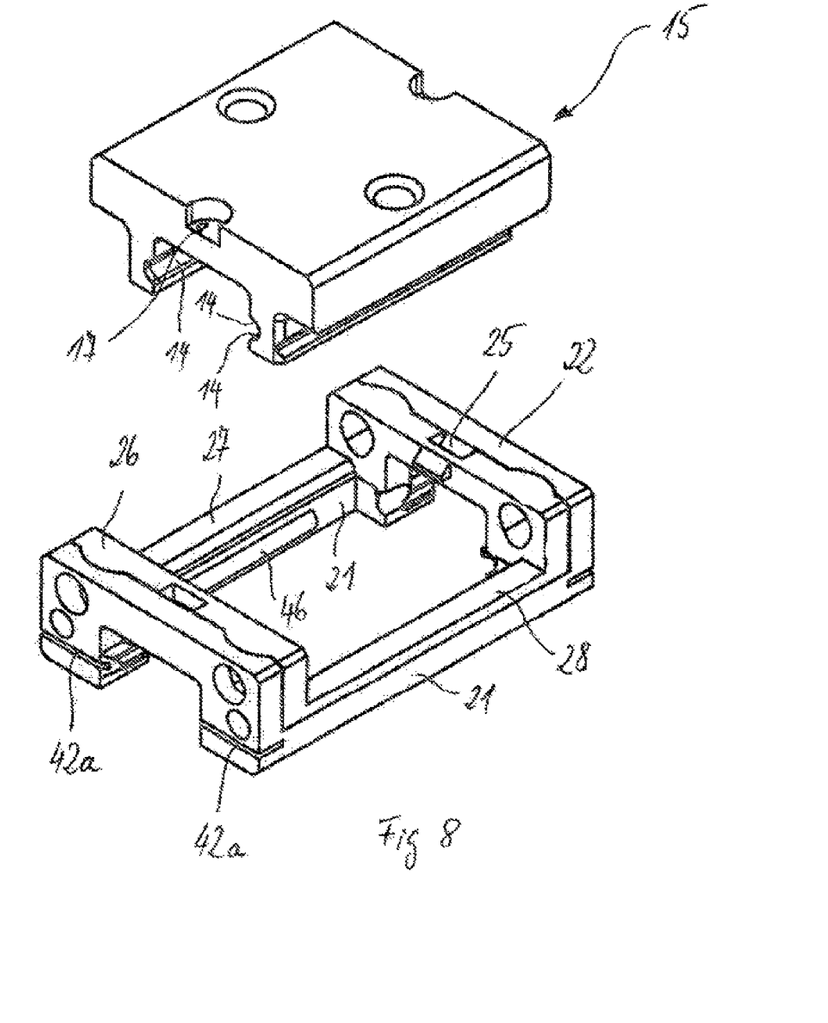
FIG. 8 a perspective view of the components of FIG. 7 assembled together, as well as a base body of the carriage.
Figure 9:
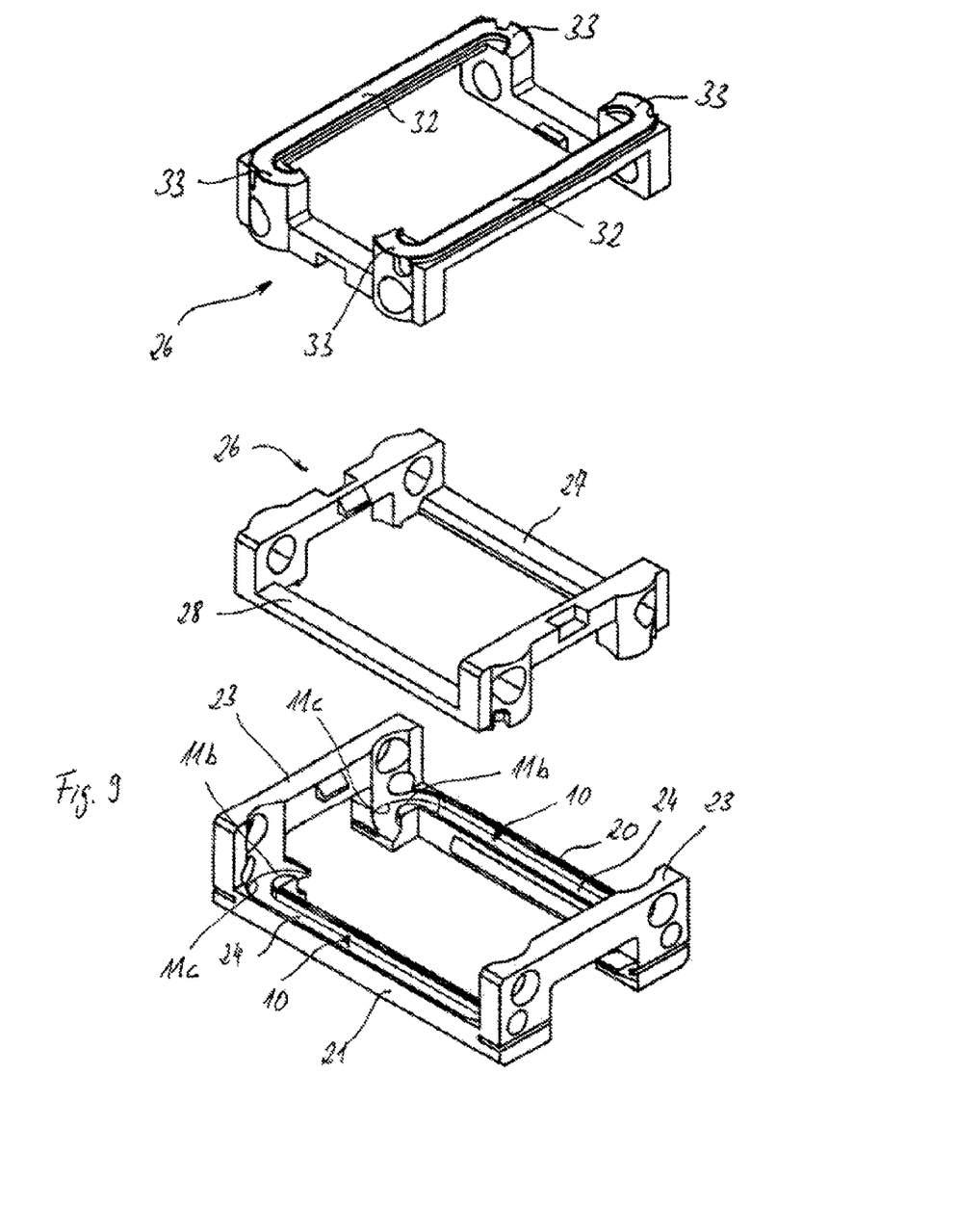
FIG. 9 a view according to FIG. 7 with a rotated perspective of the components.

It can be observed, in the exploded view of FIG. 6 as well as in FIG. 8 that the metallic base body 15 can be inserted into the insert component 26 and the insert component 26, in turn, into the single-piece plastic component 22. Here the detent lugs 40 of the insert component 26 pass into the recesses 17 of the metallic base body 15. Due to an elastic pre-loading of the detent lugs 40, the insert component 26 is hereby locked to the base body 15 and thereby releasably fastened. In other embodiments of the invention, each of the snap or snap-lock connections described here can be formed otherwise, constructively and in detail.

Moreover, the insert component can be inserted into the single-piece plastic component. As a result the webs 27, 28 of the insert component 26 pass over the webs 20, 21 of the single-piece plastic component 22, as a result of which the upper boundary surfaces 32, 33 of the webs 27, 28 cover the gutters of the deflection and return channels 10, 11 resulting from the webs 20, 21, and thus complement these gutters to form deflection and return channels 10, 11. In addition the detent lugs 23 of the single-piece plastic component 22 also pass, by means of this insertion movement into the recesses 41 of the insert component provided on the face side, whereby the insertion component 26 and the single-piece plastic component 22 are releasably connected together. The rolling bodies can be poured into the rolling body housings by means of the respective mutually aligning recesses of the plastic component 22 and of the insert component 26. With one bracket 42 that can be fastened to the carriage 5 into acceptance grooves 42a per rolling body housing 7, the rolling bodies (balls here) are protected against falling out of the load zone 8.

As assembly and centering assistance, each web 20, 21 has a form-fitting element 46 on its side facing the base body. Likewise, each leg of the base body is provided with a form-fitting element 45 congruent with the form-fitting element of the respective web 20, 21. The two respective form-fitting elements 45, 46 interlock in the assembled carriage 5 in a predetermined manner, so that the base body and the single-piece plastic component are aligned with respect to one another in a predetermined manner. In the embodiment illustrated, the form-fitting element 45 of the base body is a concave-shaped gutter running parallel to the web. The form-fitting element 46 of the plastic component 22 is, on the contrary, a convex-shaped bar, the shape, size and length of which corresponds to the shape, size and length of the gutter of the base body 15. Thus, the bar can be arranged in an explicit predefined position in the gutter, whereby an explicit predefined position between the base body 15 and the plastic component 22, and thereby the insert component as well, results.

The recesses can be closed by means of front plates 43 insertable on both face sides of the carriage 5. Wipers can be integrated into the front plates 43, which wipe dirt from the running surfaces 4 of the rail 2.

REFERENCE SYMBOL LIST 1 linear motion guide
2 guide rail
3 longitudinal axis
4 running surfaces
5 carriage
5a leg
6 assembly surface
7 running body housing
8 load zone
10 return channel
11 deflection channel
11a lower wall zone
11b inner wall zone
11c outer wall zone
14 load surfaces
15 base body
17 recess (in 15)
20 web (of 22)
21 web (of 22)
22 single-piece plastic component
23 plate-shaped section
25 detent lug (of 23)
26 insert component
27 web (of 26)
28 web (of 26)
29 bridge part
30 bridge part
32 upper boundary surface (of 10)
33 upper boundary surface (of 11)
36 bulge (of 26)
37 concave shaping (of 22)
40 detent lug (of 29, 30)
41 recess (in 26)
42 bracket
42a acceptance groove
43 front plates
45 form-fitting element (of 15)
46 form-fitting element (of 22)

The invention claimed is:

1. A carriage of a linear motion guide for arrangement on a rail of the linear motion guide, the carriage having two legs and at least a substantially U-shaped cross-section and is provided with at least one substantially U-shaped base body, which is supplemented with plastic components, wherein the carriage is provided in each of the two legs of the U-shaped based body with at least one self-contained rolling body housing, which is respectively kept open towards the rail, the carriage comprising:

a single-piece plastic component, wherein a lower boundary surface, an inner boundary surface, and an outer boundary surface and of deflection channels and return channels of the at least one self-contained rolling body housing in a respective leg of the carriage are formed in the single-piece plastic component in each of the two legs of the carriage; and a plastic insert provided on the single-piece plastic component, the plastic insert comprising two webs connected by bridge parts, a lower surface of the two webs forming upper boundary surfaces of the return channels, and a lower surface of the bridge parts forming upper boundary surfaces of the deflection channels of the at least one self-contained rolling body housing, wherein the upper boundary surfaces of the deflection channels merges continuously and without transition into the upper boundary surfaces of the return channels of a same at least one self-contained rolling body housing.

2. The carriage according to claim 1 wherein the bridge parts are formed respectively in a zone of the upper boundary surfaces of the deflection channels, which is located above the upper boundary surfaces and over the two rolling body housings and is respectively formed in one piece with the webs.

3. The carriage according to claim 1, wherein the plastic insert of the at least one self-contained rolling body housing of different ones of the two legs of the carriage and at least one of the bridge parts connecting the two webs together are formed as an overall single-piece insert component.

4. The carriage according to claim 3, wherein the single-piece insert component and the single-piece plastic component are releasably connected together by means of at least one snap connection.

5. The carriage according to claim 3, wherein the single-piece component and the base body of the carriage are releasably connected together by means of a snap coupling.

6. The carriage according claim 1, wherein the single-piece plastic component respectively has at least one connection part in a zone of a face side deflection channel, with which respectively sections of two circulation channels formed in the single-piece plastic component in the two legs of the carriage are connected together.

7. The carriage according to claim 1, wherein one front plate is fastened to outer substantially flat face surfaces of the single-piece plastic component by means of a releasable snap coupling connection.

8. The carriage according to claim 1, wherein the substantially U-shaped base body of the carriage has surfaces for load zones of the at least one self-contained rolling body housing on parallel running legs of the base body spaced relative to one another.

9. A linear motion guide for the linear guidance of objects, provided with a rail with an upper surface as well as with two lateral surfaces, wherein respectively at least one guide surface is provided on the lateral surfaces, also provided with the carriage according to claim 1, which has a substantially U-shaped cross-section, wherein in each of the two legs formed from the U-shaped configuration the at least one self-contained rolling body housing is provided, in which the rolling bodies circulate, particularly rolling balls in a load section of the return channels and the deflection channels connecting together the load section and the return channels, wherein the rolling bodies located in the load section rest both on the rail and also on the carriage.

* * * * *